May 22, 1962 L. GUICHARD 3,035,460
AUTOMATIC INFINITELY VARIABLE-SPEED DRIVE

Filed Nov. 27, 1959 2 Sheets-Sheet 1

INVENTOR
LOUIS GUICHARD
By Linton and Linton
ATTORNEYS

May 22, 1962 L. GUICHARD 3,035,460
AUTOMATIC INFINITELY VARIABLE-SPEED DRIVE
Filed Nov. 27, 1959 2 Sheets-Sheet 2
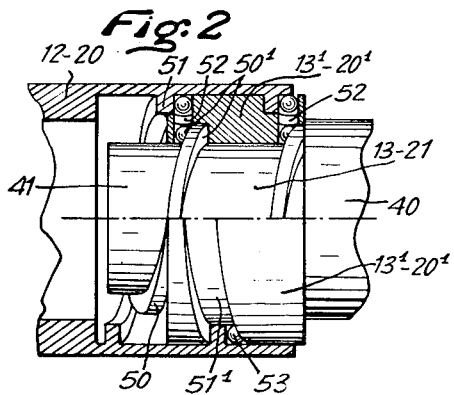
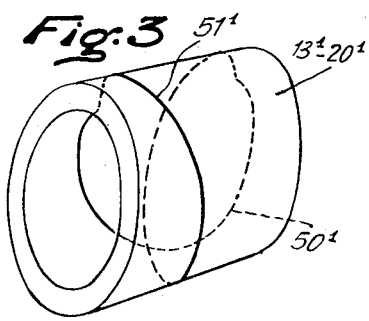
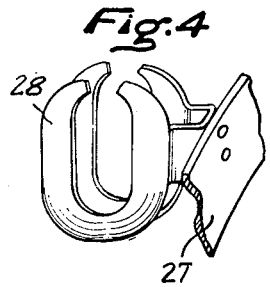
INVENTOR
LOUIS GUICHARD
By Linton and Linton
ATTORNEYS United States Patent Office 3,035,460
Patented May 22, 1962

3,035,460
AUTOMATIC INFINITELY VARIABLE-
SPEED DRIVE
Louis Guichard, 34 Rue Montmartre (Cote-d'Or),
Dijon, France
Filed Nov. 27, 1959, Ser. No. 855,585
Claims priority, application France Dec. 2, 1958
11 Claims. (Cl. 74—796)

The present invention relates to the devices for producing a gradual, continuous variation in the gear ratio between an input shaft or driving member and the output shaft or driven member of a transmission mechanism.

It is more particularly concerned with improvements in infinitely variable-speed drives of the type comprising a series of balls for the transmission of the torque which are disposed in an annular space defined by coaxial races of which at least one is solid with the output shaft. As a matter of fact, all hitherto known variable-speed drives of this character are attended by serious drawbacks such as their high cost, difficulty of manufacture, unreliable operation and limited applications due to the absence of automatism in the speed variation control and in the clutch control.

Therefore, it is the essential object of this invention to avoid these drawbacks. With this object in view, the present invention provides means for varying automatically and gradually the reduction ratio between an input or driving shaft and an output or driven shaft, these means consisting of an infinitely variable-speed drive of the type wherein a series or circular row of balls are disposed in an annular space formed by four coaxial races of which the first one is rigid with the driving shaft, the second one is axially movable in relation to the first race, the third and fourth races being also axially movable but held against rotation, this device being characterized notably in that it comprises a clutch mechanism adapted to provide a driving connection between said second race and the driven or output shaft, two clamping mechanisms for adjusting the relative spacing of the races and producing the pressure necessary for the operation of the assembly, whereby the balls which are caused by said first race to roll on said third and fourth races will carry along the second race and therefore the output or driven shaft with a reduction ratio varying as a function of the relative spacing between the first race and the second race.

According to another feature characterizing this invention the clutch mechanism comprises a disc having a clutch lining on either face, said linings being adapted with one to engage the support of said second race and the other to engage the bottom of the case rigid with the driving shaft for providing the direct drive, and a spring, interposed between the aforesaid disc and the support of the second race, urging these members away from each other.

According to another feature of this invention the four ball races are so shaped that:

(a) The driving race disposed at the outer periphery of the assembly and externally of the series of balls has a convex contour with a relatively great radius of curvature;

(b) The driven race also disposed at the outer periphery of the assembly but laterally in relation to the driving race, has a concave contour with a radius of curvature of 1.3 to 1.4 times the radius of the balls;

(c) The stationary races disposed internally of the assembly have a convex contour with a relatively small radius of curvature and are approximately identical with each other.

According to another feature characterizing this invention, each clamping mechanism consists of a main inner sleeve having an external helical ramp formed thereon, of a main outer sleeve having an inner helical ramp formed therein and of an intermediate sleeve formed with an outer helical groove with the two main sleeves as well as the grooves of the intermediate sleeve being reversed with a view to provide a double-acting automatic clamping action.

The device constituting the subject-matter of this invention is characterized by many practical advantages. Thus when this device is mounted in an automotive drive the engine reaction torque may be used as an auxiliary brake or retarding means without the assistance of any additional members or devices. Moreover, it permits of establishing the driving engagement between the driving and driven members at any moment and with the desired transmission ratio and, finally, it provides the automatic clutch engagement and disengagement. In addition, this device is extremely simple in design and to manufacture, and it can be produced at a relatively low cost. It is sturdy, compact and easy to disassemble, while its maintenance is reduced to a minimum.

This invention is also concerned with the features set forth hereafter and with their various possible combinations.

In order to afford a full understanding of the present invention and of the manner in which the same may be carried out in practice, reference will now be made to the attached drawings forming part of this specification and illustrating diagrammatically by way of example a typical form of embodiment of the invention. In the drawings:

FIGURE 2 is a fragmentary axial section showing the relative arrangement of the sleeves constituting one of the automatic clamping devices with the component elements designated by paired reference numerals representing identical elements but having a different function in each of the two automatic clamping devices;

FIGURE 3 is a diagram showing the travel accomplished by the balls in the grooves of the intermediate sleeve, and FIGURE 4 is a perspective detail view showing one of the cages for retaining the positioning of the balls in the device of this invention.

Figure 1:
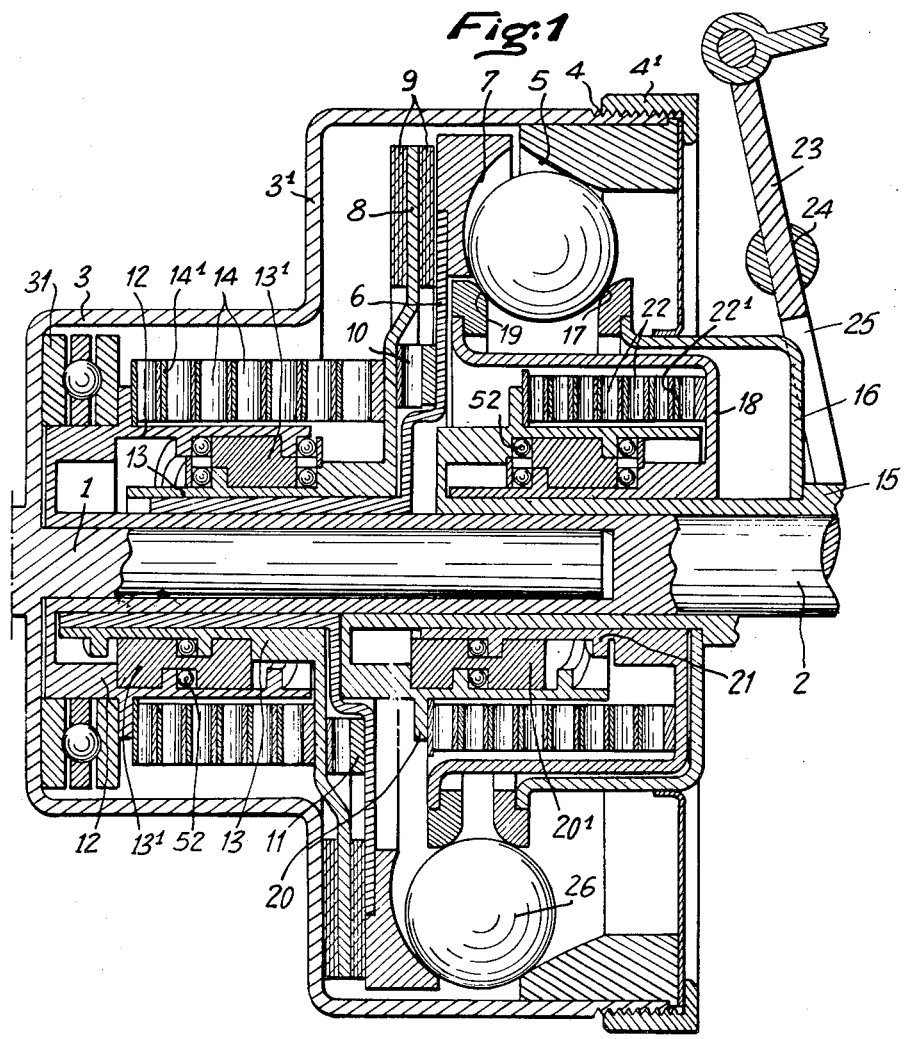
FIGURE 1 is an axial section showing in its upper half the drive of this invention in its inoperative condition with the clutch disengaged, and in its lower half the same device in its operative condition.

As illustrated in the drawings, the device constituting the subject-matter of this invention comprises an input or driving shaft 1 and an output or driven shaft 2 disposed coaxially to each other, the driven or output shaft 2 revolving freely in relation to the driving or input shaft 1. Rigid with the driving shaft 1 is a cylindrical, substantially bell-shaped case 3 the mouth 4 of which is formed with an externally threaded portion adapted to receive an internally threaded flanged ring 4' for mounting the driving ball race in the case 3. Said case 3 has clamped against the edge of its mouth 4 a narrow flange formed on a cylindrical ring member having a convex internal face constituting the ball race 5. This race 5 has a relatively large radius of curvature and constitutes the driving ball race. Mounted for loose rotation on the output or driven shaft 2 is a support 6 for a cylindrical ring formed with a convex lateral face constituting another ball race 7. This race 7 is the driven race and its sectional contour is such that its smaller radius is inferior to the distance measured from the center of the balls, to be described presently, to the axis of the device.

Behind the support 6, that is, in a direction away from the driving race 5 and toward one of the walls of the case 3, and in the direction of the driving shaft 1, a clutch disc or plate 8 is mounted and carries on either face a clutch lining 9. This clutch disc 8 serves the purpose of transmitting the driving torque to the driven shaft and is rigid with a sleeve 13 mounted on the driven shaft 2 and adapted to be screwed by means of another intermediate sleeve 13' in another tubular member 12 rigid with the inner end of the driven shaft 2. This assembly of tubular members or sleeves constitutes an automatic clamping device for drivingly connecting the clutch 8 to the driven shaft 2.

To this end the two main sleeves of this clamping device, that is, the inner sleeve 13 and the outer sleeve 12, are each formed with a helical ramp 50, 51, respectively, coacting with relevant grooves 50', 51' formed on the intermediate sleeve 13'. These internal and external grooves 50', 51' respectively are reversed in relation to each other with a view to provide a double-acting clamping action. A row of balls 53, shown only in diagrammatic form in FIGS. 2 and 3, is provided between the ramp 51 and the wall of groove 51', as well as between the ramp 50 and groove 50', the purpose of these balls constituting in facilitating the relative slipping of the sleeve during their relative movements. Passages 52 formed on the intermediate sleeve enable the balls 53 to pass freely from groove 51' to groove 50' during the displacement of this last-mentioned sleeve. FIG. 3 shows diagrammaitcally the path followed by the balls 53. The inner sleeve 13 consists of two cylindrical portions, one of reduced diameter 41 and another of larger diameter 40 (FIG. 2). This difference in diameter is chosen in order to provide at the junction of the two portions of different diameter a shoulder, the function of which will be set forth presently in the description of the operation of the device. A spring 14 consisting of a plurality of corrugated steel washers is disposed around the external sleeve 12 so as to urge same away from the inner sleeve 13 (FIG. 1). Another spring 10, also consisting of corrugated steel washers, is interposed between the clutch plate 8 and the support 6 carrying the driven ball race 7, this spring 10 reacting against the support 6 through the intermediary of a friction lining 11.

Preferably, the corrugated steel washers constituting the springs 14 and 10 are so designed and made of such material as to have a relatively high elasticity and at the same time an adequate strength. On the other hand, a spring made from washers of this type affords an easier adjustment of the device forming the subject-matter of this invention since it is possible to add or remove a number of washers according to the desired clamping strength. On the other hand and preferably, flat washers 14' may be interposed between the adjacent corrugated washers 14, 10 in order to prevent them from becoming angularly coincident and thus impairing the desired flexibility of the spring system.

Threaded on the output shaft 2 is a plain cylindrical sleeve 15 carrying a bell-shaped support 16 rigid therewith, the outer, slightly flanged edge of this support 16 having secured thereon a substantially cylindrical ring formed with a convex race 17. Another, substantially bell-shaped support 18 somewhat deeper than the aforesaid support 16 is disposed coaxially to the sleeve 15 and carries on its outer, slightly flanged edge, another substantially cylindrical ring also formed with a convex surface constituting another race 19. The ball races 17 and 19 have a relatively small radius of curvature and are held against rotation relative to the driving race 5 and driven race 7. However, a moderate relative displacement between these races 17 and 19 is allowed in the axial direction.

This moderate displacement is made possible through the provision of another automatic clamping device arranged like the one described hereinabove and consisting therefore of an outer cylindrical sleeve 20 rigid with the end of the cylindrical sleeve 15 internally of the case 3 and also with the inner race 17, this sleeve 20 being screwed on an inner sleeve 21 rigid with the other inner race 19 through the medium of an intermediate socket 20'. The inner sleeve 21 is mounted for loose rotation on sleeve 15 but is rigid with the support 18. The manner in which these various sleeves and sockets co-act is similar to that described with reference to the first clamping device. A spring 22 also consisting of corrugated steel washers co-acting with flat washers 22' urges the two races 17 and 19 toward each other by acting on the one hand upon the support 16 through the medium of the outer sleeve 20 and on the other hand upon the support 18.

The device constituting the subject-matter of this invention comprises furthermore an external control lever 23 fulcrumed at 24 and provided at its inner end with a fork 25 whereby the sleeve 15 can be displaced axially while preventing its rotation. Thus, the arrangement constituted by the four races 5, 7, 17 and 19 provides an annular space in which a set of relatively large balls 26, retained and positioned by cages 28 (see FIG. 4), are disposed, these cages 28 being secured to an annular member or support 27 rotating freely about the axis of the device. Each cage contains a ball 26 and is of substantially cylindro-spherical configuration with two symmetrical, widely apertured side faces rigidly secured on the support 27. Under these conditions it will be readily understood that with this cage system 28, 27 the balls 26 can move in relation to the axis of the device while constantly engaging the four races 5, 7, 17 and 19.

A thrust ball-bearing 31 fitted at the front end of the device permits the free rotation of the shaft 2 and sleeve 12 in relation to the input shaft 1.

The operation of the device described hereinabove and illustrated in the accompanying drawings will be readily understood. The driven or output shaft 2 is assumed, in the initial conditions, to be stationary. The driving race 5 revolves bodily with the driving shaft 1 and causes the balls 26 to roll on the fixed races 17, 19 and to carry along without slippage the driven race 7 engaged by these balls and rotating loosely on the output shaft 2. As the velocity of rotation of the driving race 5 increases, the centrifugal force to which the balls 26 are subjected increases in proportion thereto and these balls 26 exert a pressure against the races 7 and 19, thus moving the race 19 in relation to the race 17 and causing a relative movement of rotation of the outer sleeve 20 with respect to the inner sleeve 21. Under these conditions, the intermediate sleeve 20' is moved for example to the left as in the case of FIGS. 1 and 2, due to the combined action of the helical ramps 50 and 51, relative to the grooves 50' and 51' of this intermediate sleeve 20' which, at the end of this movement, is stopped by the shoulder formed by the junction of the portions 40 and 41 of different diameter which constitute the inner sleeve 21.

At the same time the balls 26, as they move away from the common axis of the driving and driven shafts 1, 2, increase the gap between the driven race 7 and the driving race 5. Thus, the driven race 7 compresses the spring 10 and contacts the friction lining 9 of the clutch plate 8 registering therewith, thus causing said clutch plate 8 to be carried along and tend, due to the centrifugal force applied by the balls 26, to produce the rotation of the inner sleeve 13 of the first clamping device with which it is rotatably solid. The inner sleeve 13 will therefore revolve in relation to the outer sleeve 12 rigid with the output or driven shaft 2, thus producing an axial displacement of the intermediate sleeve 13' to the right, as in the operation of the second clamping device described hereinabove, due to the combined action of the helical ramps 50, 51 and grooves 50', 51' of this sleeve. At the end of the stroke, the intermediate sleeve 13' is also stopped by the shoulder formed by the junction of the two portions of different diameter 40 and 41 of the inner sleeve 13, and as a consequence the clutch becomes rigid with the driven shaft 2, the latter being carried along gradually as a function of the centrifugal force produced by the rotating balls 26.

Of course, the transmission ratio depends on the respective configuration of the four races 5, 7, 17, and 19 and varies as a function of the position of the balls 26 with respect to the common axis of the driving and driven shafts 1, 2.

When, during the exertion of the centrifugal force, the driven race 7 is forced to its position remotest from the driving race 5, the lining 9 of the clutch plate 8 engages the wall 3' of case 3, and under these conditions the transmission ratio is 1:1, and as the output shaft 2 is driven directly from the input shaft 1, a direct-drive transmission is obtained.

In normal driving operation, the drive ratio is automatically changed according to the speed of the input shaft 1 as well as to the resisting torque. When the clutch 8 and 9 are coupled, if the speed of the input shaft increases further, the balls 26 move further radially outwards, and axially towards the left of FIGURE 1, thus pressing more against part 8 for compressing spring 14 and against the axial force due to the clamping device 13, 13' and 12. The movement towards the left is limited by the contact of the lining 9 against part 3'. Where there is a direct drive, drive ratio=1, the balls 26 are rolling on the largest equal circumferences of races 7 and 5, as shown in the lower half of FIGURE 1. The change of ratio is thus obtained according to the input shaft speed.

Concerning the automatic change according to the torque transmitted and the operation of the clamping devices, on the beginning of the driving of the output shaft, the intermediate sleeves 13' and 20' are moved immediately in one direction or the other according to the direction of the rotation. FIGURE 1 shows the position in the case of rotation in the clockwise direction seen from the left end. In such a case, the intermediate sleeve 13' moves immediately towards the right against the shoulder of the inner sleeve 13 and thereafter, the threading movements are only between the sleeves 13' and 12. Concerning the other clamping device, if there is a resisting torque on race 7, balls 26 rotate along an axis above race 19 and tend to move race 19 in an anticlockwise direction in such a manner that the intermediate sleeve 20' is moved immediately towards the left against the shoulder of sleeve 20, lower half of FIGURE 1. If the direction of rotation were reversed, the intermediate sleeves would be moved at the opposite ends of their strokes but, in both cases, the two clamping devices exert axial forces which are approximately proportional to the torque transmitted and these forces tend to bring nearer one from the other the races 5 and 7 on one hand and the races 17 and 19 on the other hand.

It is also within the scope of this invention to provide the possibility of either varying the transmission ratio at will, or locking the ratio of transmission of the engine speed to the velocity of rotation of the driven shaft at the desired value. To this end, the operator or any suitable and known automatic or servo-operated means may move the control lever 23 to the desired position as this lever 23, as already explained, controls the position of the race 17 through the medium of the sleeve 15. This positioning movement can be effected whether the engine is running or not.

From the foregoing it will be readily understood that the present invention provides a progressive and automatic infinitely variable-speed drive characterized by a completely automatic operation as a function of the engine speeds and torques transmitted therethrough, this drive being adapted nevertheless to be controlled from external means such as manual control means or servo means.

Moreover, the device according to this invention affords a wide range of variation due to the specific relative arrangement and to the specific configuration of the four races utilized in combination with automatic, double-acting clamping means. As a matter of fact, the contours of these races are so designed that the driving race 5 disposed externally of the circular row of balls has a convex curvature having if desired a frustoconical shape, that is, a rectilinear generatrix, the laterally disposed driven race 7 having a concave curvature with a radius representing 1.3 to 1.4 times the radius of the balls 26, whereas the stationary races have a convex contour of relatively small radius of curvature and are generally similar. On the other hand, the use of double-acting clamping mechanisms will not only permit the operation of the device in either direction of rotation of the engine but also reduce the over-all and notably the axial dimensions of the device.

I claim:

1. A variable-speed drive comprising four coaxial races, a circular row of balls is disposed in a space defined by said four coaxial races, a driving shaft, one of said races being fixedly connected to said driving shaft, a second of said races being axially movable in relation to said first-mentioned race, the third and fourth of said races being axially movable but held against rotation, a driven shaft, a clutch mechanism for operatively connecting and disconnecting said second race of said driving shaft, a pair of clamping mechanisms capable of adjusting the relative spacing between said races and producing the pressure necessary for the operation of the drive, whereby the balls driven by said first race to roll on said third and fourth races will drive said second race and, therefore, said driven shaft with a transmission ratio varying with the relative spacing between said first race and second race.

2. A variable-speed drive according to claim 1, wherein a support carries said second race, a case encloses said drive and is fixedly connected to said driving shaft, said clutch mechanism comprises a clutch plate carrying a friction lining on either face with one friction lining being adapted to engage said support carrying said second race, the other friction lining being adapted to engage said case, the engagement of said other friction lining with said case providing a direct drive between said driving shaft and said driven shaft and a spring is interposed between said clutch plate and said support of said second race for urging these members away from each other.

3. Infinitely variable-speed drive according to claim 1, wherein said four races are positioned such that the first-mentioned driving race is disposed at the outer periphery of the drive and externally of said circular row of balls and has a convex contour having a relatively large radius of curvature, the second-mentioned driven race is also disposed at the outer periphery of the drive but laterally with respect to said driving race and has a concave contour with a radius of curvature equal to 1.3 to 1.4 times the radius of said balls, whereas, said fixed races are secured internally of the drive and have a convex contour with a relatively small radius of curvature and are substantially similar.

4. A variable-speed drive according to claim 1, wherein each clamping mechanism consists of a main inner sleeve formed with an external helical ramp, a main outer sleeve formed with an inner helical ramp, and an intermediate sleeve formed with an inner helical groove and an outer helical groove, both of said main sleeves as well as the grooves of said intermediate sleeve being reversed to provide an automatic double-acting clamping effect, a series of balls disposed between the ramps of said main sleeves and the relevant grooves of said intermediate sleeve, said intermediate sleeve having orifices to permit the passage of said balls from one groove to another during the movement of said intermediate sleeve.

5. A variable-speed drive, according to claim 1, wherein a substantially cylindrical case in which the component elements of the drive are mounted is fixedly connected to said driving shaft, said first race is secured through its outer periphery in the mouth of said case by means of a clamping ring screwed on said case.

6. A variable-speed drive, according to claim 1, wherein said driving shaft and said driven shaft have a common axis, a support having said second race mounted thereon is also mounted for loose rotation relative to said driven shaft and is adapted to slide in the axial direction thereon.

7. A variable-speed drive, according to claim 1, wherein a support has said third race fixedly connected thereto, a socket fixedly connected to said support is adapted to slide in the axial direction on said driven shaft but is held against rotation thereon.

8. A variable-speed drive, according to claim 1, wherein said fourth race has the same diameter as said third race and a support adjacent to said third race has said fourth race mounted thereon.

9. A variable-speed drive, according to claim 1, wherein the first clamping mechanism has an outer sleeve fixedly connected to said driven shaft, and an inner sleeve fixedly connected to the clutch mechanism.

10. A variable-speed drive, according to claim 1 wherein said second of said clamping mechanisms has an outer sleeve, a support carries the third race and has said outer sleeve fixedly connected thereto and an inner sleeve, and a support carries said fourth race and is fixedly connected to said inner sleeve.

11. A variable speed drive according to claim 1, wherein an external control member is provided for varying at will the position of said third race along the axis of the device.

References Cited in the file of this patent

UNITED STATES PATENTS

| | | |
|---|---|---|
| 2,590,800 | Stephenson | Mar. 25, 1952 |
| 2,878,692 | Wolf | Mar. 24, 1959 |

FOREIGN PATENTS

| | | |
|---|---|---|
| 446,140 | Germany | June 23, 1927 |
| 343,813 | Italy | July 3, 1935 |